(12) United States Patent
Scholles

(10) Patent No.: US 11,202,994 B2
(45) Date of Patent: Dec. 21, 2021

(54) MEMBRANE POCKET MODULE HAVING ROTATIONALLY SECURED DEFLECTION DISCS

(71) Applicant: Helmholtz-Zentrum hereon GmbH, Geesthacht (DE)

(72) Inventor: Carsten Scholles, Hamburg (DE)

(73) Assignee: Helmholtz-Zentrum hereon GmbH, Geesthacht (DE)

( * ) Notice: Subject to any disclaimer, the term of this patent is extended or adjusted under 35 U.S.C. 154(b) by 0 days.

(21) Appl. No.: 16/570,883

(22) Filed: Sep. 13, 2019

(65) Prior Publication Data

US 2020/0086275 A1    Mar. 19, 2020

(30) Foreign Application Priority Data

Sep. 13, 2018 (EP) ..................................... 18194151

(51) Int. Cl.
*B01D 63/08* (2006.01)

(52) U.S. Cl.
CPC .... *B01D 63/084* (2013.01); *B01D 2201/4046* (2013.01); *B01D 2313/086* (2013.01)

(58) Field of Classification Search
CPC .. B01D 63/084; B01D 63/082; B01D 53/228; B01D 2201/302; B01D 2201/4046;
(Continued)

(56) References Cited

U.S. PATENT DOCUMENTS 2,873,030 A * 2/1959 Ashton ................... B01D 29/46
                                                                 210/444
4,695,380 A   9/1987 Hilgendorff et al.
(Continued)

FOREIGN PATENT DOCUMENTS

DE    3715183 A1   11/1988
DE    3507908 C2   12/1988
(Continued)

OTHER PUBLICATIONS

European Patent Application No. 18194151.9, Search Report, dated Mar. 22, 2019.
(Continued)

*Primary Examiner* — Pranav N Patel
(74) *Attorney, Agent, or Firm* — Marshall, Gerstein & Borun LLP

(57) ABSTRACT

The invention relates to membrane modules, in particular membrane pocket modules, which comprise membrane pocket stacks which are disposed in a housing having at least one feed inlet, at least one retentate outlet, and at least one permeate outlet. The invention also relates to the use of the membrane module according to the invention for separating mixtures of liquids and/or gases. The membrane of the previously known type, also referred to as a GS module, comprises a housing which for forming a container interior space by means of finisher discs at two end sides is closed in a pressure-tight manner. The finisher discs comprise at least one feed inlet, at least one retentate outlet, and one permeate outlet, wherein at least one membrane pocket stack which has a plurality of membrane pockets which are lined up beside one another and are mutually separated by seals and which are push-fitted onto a permeate tube is disposed in the container interior space. The permeate tube protrudes beyond the at least one permeate outlet of the finisher discs. The membrane module according to the invention is characterized in that the permeate tube and the permeate outlet of the finisher discs are aligned in an alternating manner by way of a key-and-groove connection.

6 Claims, 3 Drawing Sheets

(58) Field of Classification Search
CPC .... B01D 2201/4053; B01D 2201/4061; B01D 2313/08; B01D 2313/086; B01D 63/00; B01D 29/395; B01D 29/007; B01D 29/41; B01D 29/0068; B01D 2313/56
See application file for complete search history.

(56) References Cited

U.S. PATENT DOCUMENTS

| | | | |
|---|---|---|---|
| 4,892,657 | A | 1/1990 | Mohn et al. |
| 5,500,122 | A | 3/1996 | Schwartz |
| 5,520,807 | A | 5/1996 | Myrna et al. |
| 5,891,222 | A | 4/1999 | Hilgendorff et al. |
| 5,925,247 | A | 7/1999 | Huebbel |
| 6,059,856 | A * | 5/2000 | Ohlrogge ............... B01D 53/22 95/1 |
| 7,678,273 | B2 | 3/2010 | Harms et al. |
| 2007/0151916 | A1 * | 7/2007 | Knappe ................. B01D 61/18 210/321.74 |

FOREIGN PATENT DOCUMENTS

| | | | |
|---|---|---|---|
| DE | 19536560 | | 3/1997 |
| EP | 0752974 | A1 * | 1/1997 ........... B67D 7/0476 |
| EP | 1475142 | A1 | 11/2004 |
| WO | WO-96/20775 | A1 | 7/1996 |

OTHER PUBLICATIONS

Melin et al., Membranverfahren—Grundlagen der Modul- und Anlagenauslegung (Membrane methods—Fundamentals in the design of modules and systems), 3. Aufl. (3rd edition), 2007, pp. 170 to 172 and Fig. 5.22.

Nitsche et al., Abtrennung organischer Dämpfe mit Membranen (Separation of organic vapours using membranes), Chemie Ingenieur Technik (70), p. 515, Fig. 3.

* cited by examiner

MEMBRANE POCKET MODULE HAVING ROTATIONALLY SECURED DEFLECTION DISCS

CROSS-REFERENCE TO RELATED APPLICATION

The present application claims priority to European Application No. 18194151.9, filed Sep. 13, 2018, the entire disclosure of which is hereby incorporated by reference in its entirety.

BACKGROUND TO THE INVENTION

The invention relates to membrane modules, in particular membrane pocket modules, which comprise membrane pockets stacks which are disposed in a housing having at least one feed inlet, at least one retentate outlet, and at least one permeate outlet. The invention also relates to the use of the membrane module according to the invention for separating mixtures of liquids and/or gases.

Prior to membranes being able to be rendered utilizable in technical processes, said membranes have to be inserted into an application-specific assembly which is manageable in practical terms. The membrane configurations arising herein are referred to as membrane modules. A feed flow (feed) in a membrane module is divided into a concentrate flow (retentate) and into a filtrate flow (permeate).

In the technology of separation and enrichment, flat membranes in pocket form are inter alia used. In the case of pocket membranes (also referred to as cushion membranes) two individual flat membranes having a spacer lying therebetween are welded or adhesively bonded at the peripheries so as to form a pocket (a cushion). Bores that are centred in the membrane pocket enable the discharge of permeate from the internal region of the membrane pockets in the direction of a permeate tube which is push-fitted through the bores. The stacking of the pockets so as to form a module is typically performed in an alternating manner using annular seals such that no retentate can make its way into the permeate tube.

The membrane pockets that are push-fitted about the permeate tube are installed in a housing wherein the feed can flow about the membrane pockets. The permeate of the pockets is dissipated centrally toward the inside and discharged by way of the permeate tube which at two end sides protrudes beyond finisher discs of the housing surrounding the membrane pockets and with the aid of permeate caps is flange-fitted to said finisher discs. In the case of a GS pocket module the feed preferably flows about the membrane pockets in a meandering manner, caused by deflection discs which are additionally incorporated in the membrane module and which subdivide the membrane module into subportions (compartment regions).

Such a GS pocket module is known from DE-PS 35 07 908, the entire disclosure of which is hereby incorporated by reference in its entirety, wherein membranes are surrounded by a housing having two end plates, are stacked at a mutual spacing, and have a central internal bore into which a permeate tube is plug-fitted. The end plates (finisher discs) close the housing in a sealing manner at the end sides thereof and have a feed line for the feed flow, a discharge line for the retentate flow, and at least one central discharge line for the permeate flow (FIG. 9). Deflection discs that are incorporated in the membrane stack cause a meandering flow about the membrane pockets by the feed.

The construction of GS pocket modules of this type is furthermore described in T. Melin, R. Rautenbach "*Membranverfahren—Grundlagen der Modul-und Anlagenauslegung*", 3. Aufl., 2007 Seiten 170 bis 172 und Abb. 5.22. (*Membrane methods—Fundamentals in the design of modules and systems,* 3rd edition, 2007, pages 170 to 172 and FIG. 5.22) and V. Nitsche et al. "*Abtrennung organischer Dämpfe mit Membranen*", Chemie Ingenieur Technik (70), Seite 515, Abb. 3, ("Separation of organic vapours using membranes", Chemie Ingenieur Technik (70), page 515, FIG. 3), the entire disclosures of (both of) which are hereby incorporated by reference in their entirety.

In order for the membrane pocket modules to be produced, the permeate tube is first connected to one of the finisher discs for the housing, the pocket membranes and the deflection discs are stacked over the permeate tube and, incorporated in a housing, subsequently connected to the second finisher disc. The pocket membranes and the deflection discs in the housing are then compressed to a predetermined size with the aid of a press. The permeate tube protruding beyond the finisher discs is fixed to the finisher discs with the aid of permeate caps, and the pressure of the press is relaxed. The press is required in order to guarantee the meandering flow about the membrane pockets.

The permeate caps which mutually fix the permeate tube and the finisher discs can become loose in operation. In the case of the known GS membrane modules it is disadvantageous that the finisher discs when retightening the permeate caps rotate the membrane stack and the deflection discs, this being caused by the rotation of the finisher discs, this leading to losses in terms of efficiency up to the membrane being rendered useless. Also, the membrane pockets cannot be replaced without a press.

It is an object of the present invention to provide a membrane module of the type mentioned at the outset in which the membrane pockets can be replaced in a simple manner.

The object is achieved by a membrane module according to Patent claim 1. Preferred embodiments are set forth in the dependent claims.

DESCRIPTION OF THE INVENTION

The membrane module of the previously known type comprises a housing which for forming a container interior space by means of finisher discs at two end sides is closed in a pressure-tight manner. The finisher discs comprise at least one feed inlet, at least one retentate outlet, and one permeate outlet, wherein at least one membrane pocket stack, which has a plurality of membrane pockets, which are lined up beside one another and are mutually separated by seals and which are push-fitted onto a permeate tube, is disposed in the container interior space. The permeate tube protrudes beyond the at least one permeate outlet of the finisher discs. The membrane module according to the invention is characterized in that the permeate tube and the permeate outlet of the finisher discs by way of a key-and-groove connection are aligned in an alternating manner.

According to one embodiment of the present invention, the membrane pocket stacks furthermore comprise deflection discs that by means of a central bore are push-fitted onto the permeate tube, wherein the deflection discs have in each case recesses for directing in a meandering feed stream a feed flow from the at least one feed inlet to the at least one retentate outlet, and the permeate tube and the deflection discs by way of a key-and-groove connection are likewise aligned in an alternating manner. The deflection discs subdivide the membrane pocket stacks into compartment regions. According to one preferred embodiment, the number of membrane pockets in the compartment regions subdivided by the deflection discs decreases in the direction from at least one feed inlet to at least one retentate outlet.

According to one further embodiment of the present invention a stage separation disc is furthermore fastened to the permeate tube. The stage separation disc can be fastened to the permeate tube for example by screw-fitting by means of an internal thread, or by welding. The stage separation disc subdivides the housing into two stages which from the respective opposite side can be equipped with dissimilar membrane stacks. However, the stages can also be equipped with membrane stacks on one side, so that one side of the stage remains unutilized. The stage separation discs are preferably closed on the internal side such that dissimilar permeate flows can be discharged at different ends of the permeate tube.

According to one further embodiment of the present invention at least one groove is provided in the permeate tube, and at least one feather key is in each case provided in the permeate outlet of the finisher discs and, if present, in the central bore of the deflection discs. Furthermore preferably, at least two grooves are provided in the permeate tube, and two feather keys are in each case provided in the permeate outlet of the finisher discs and, if present, the central bores of the deflection discs. Furthermore, the grooves in the permeate tube and the feather keys are in each case offset by 180°.

According to one further embodiment of the present invention, the housing is a pressure-resistant housing. The housing is preferably cylindrical. Furthermore, the permeate tube is preferably also cylindrical and through a central bore protrudes beyond the finisher discs of the housing beyond the latter.

It has been surprisingly demonstrated that the construction of the membrane module according to the invention enables the membrane module to be produced or the membranes to be refurbished without a press being required.

The membrane module according to the invention can be used for separating mixtures of liquids and/or gases. The membrane module according to the invention is particularly advantageously used for reducing emissions on breathing lines of storage tanks, as is described in EP 0 752 974 B1, the entire disclosure of which is hereby incorporated by reference in its entirety. It is advantageous herein that membrane pockets, in particular in aggressive environments in which the membrane pockets have a short service life, can be replaced in a simple manner without the system having to be shipped to the manufacturer.

DETAILED DESCRIPTION OF THE INVENTION

The invention will henceforth be explained in more detail in an exemplary manner by means of figures which do not limit the invention. In said figures.

Figure 1:
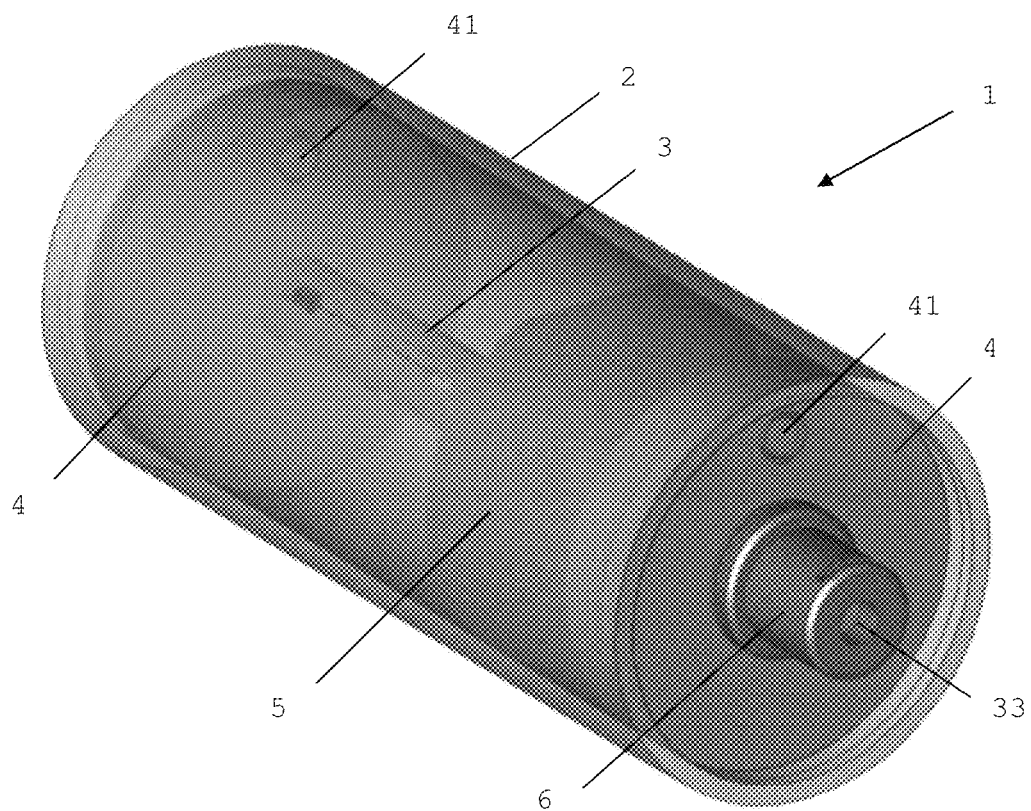
FIG. 1 is a schematic illustration of a membrane module according to the invention, wherein the housing, the finisher discs, the deflection discs, the permeate tube, and the permeate caps, but not the membrane stack, are illustrated in the figure.

Reverting to FIG. 1, the membrane module 1 according to the invention has a housing 2 which for forming a container interior space by means of finisher discs 4 at two ends sides is closed in a pressure-tight manner. Bores 41 for the feed inlet or the retentate outlet, respectively, are situated in the finisher discs 4. Furthermore, bores for push-fitting a permeate tube 3 are situated in the finisher discs 4, said bores 41, as is shown in an exemplary manner here, centrally being disposed in the finisher discs 4. The permeate tube 3 by means of a permeate cap 6 is on both sides flange-fitted to at least one of the finisher discs 4. At least one end of the permeate tube 3 comprises a permeate outlet 33.

One or a plurality of deflection discs 7 (FIG. 4) are situated in the housing, wherein the deflection discs 7 have in each case recesses for directing in a meandering feed stream a feed flow from the at least one feed inlet 41 to at least one retentate outlet. The deflection disc 7 likewise have a bore for push-fitting a permeate tube 3, said bore centrally being disposed in the deflection discs 7. A plurality of deflection discs 7, for example two, three, four, five, six, seven, eight, nine, or ten, or even more, deflection discs 7, for forming a plurality of compartment portions of the membrane module are typically disposed in the housing. Membrane pockets stacks (not shown) which divide the feed flow into a retentate flow and a permeate flow are disposed between the finisher discs 4, or between the deflection discs 7 and the finisher discs 4, or between the finisher discs 7, respectively. The stacking of the pockets is preferably performed in an alternating manner using this annular seal so that no retentate can make its way into the permeate tube. The permeate of the pockets is dissipated centrally toward the inside and is discharged by way of the permeate tube.

FIG. 1 in an exemplary manner shows an assembly having a stage separation disc 5 which divides the membrane module into dissimilar stages.

Figure 2:
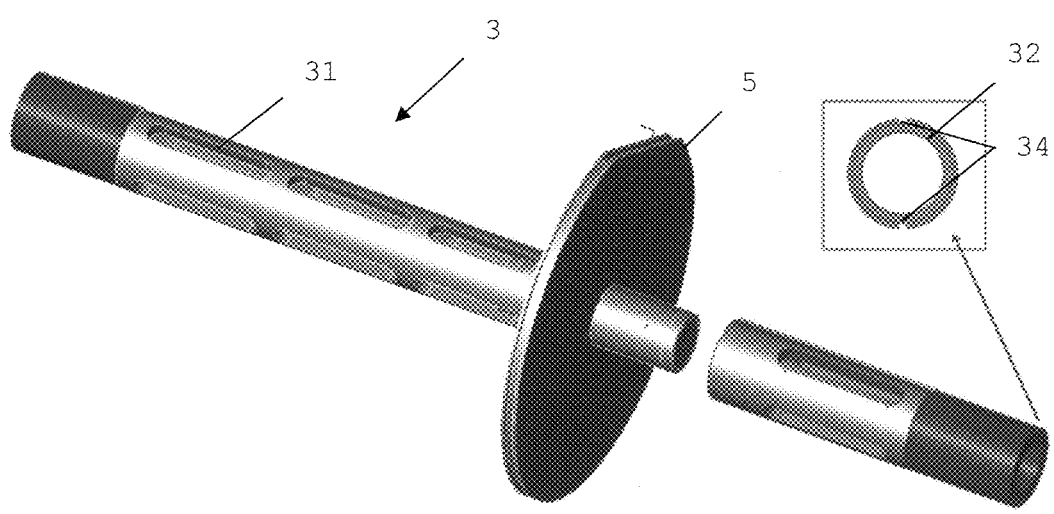
FIG. 2 is a schematic illustration of a permeate tube having an assembled deflection disc, said permeate tube being capable of being used in the membrane module according to the invention.

FIG. 2 shows a schematic illustration of a permeate tube 3 according to the invention, having an assembled stage separation disc 5. The permeate tube 3 shown has a round permeate tube cross section 32 which is provided with two grooves 34 which are offset by 180°. The permeate tube has a plurality (for example two, three, four, five, six, seven, eight, nine, ten, eleven, twelve, thirteen, fourteen, fifteen, sixteen, or even more) of permeate inlet bores 31 for receiving the permeate flow from the membrane pockets. The permeate tube 3 can be integral or in multiple parts, such that a stage separation disc can be push-fitted thereon and again be removed therefrom when required. A two-part permeate tube 3 in which a stage separation disc 5 is screw-fitted to the permeate tube 3 by means of an internal thread, or is welded thereto, is shown in FIG. 2. Deflection discs 7 (FIG. 4) which within a membrane stage subdivide the latter into compartment regions are push-fitted conjointly with the membrane stacks onto the permeate tube 3.

The stage separation disc 5 preferably has a substantially circular cross-section which corresponds to the cross section of the housing, wherein the cross section is however chamfered on a circular segment such that the feed flow within the housing can make its way from one stage to the next. The stage separation disc on the circumference thereof preferably has a groove into which a seal, such as a rubber seal, can be inserted. The permeate tube 3 preferably has at least one external thread, preferably at least two external threads, for fixing at least one permeate cap 6, preferably two permeate caps 6. It is also provided that the permeate tube 3 is in two parts, wherein one part of the permeate tube 3 at the ends thereof supports two external threads, for fixing the permeate cap 6 by means of an internal thread in the permeate cap 6, on the one hand, and for fixing a stage separation disc 5 by means of an internal thread in the stage separation disc 5 as well as a second part of the permeate tube 3 by way of an internal thread of the second part of the permeate tube 3, on the other hand. The second part of the permeate tube 3 at one end has an internal thread for fixing the first part of the permeate tube 3 on the external thread of the latter, and the stage separation disc lying therebetween, and at the other end an external thread for fixing the permeate cap 6.

The permeate outlet 33 is performed centrally by way of the permeate tube, for example by applying negative pressure. If the membrane module 1 by way of a stage separation disc 5 is subdivided into two stages, the permeate outlet 33 of the respective stages is performed at opposite side of the permeate tube 3; consequently, two permeate outlets 33 are provided in the case of this configuration.

Figure 3:
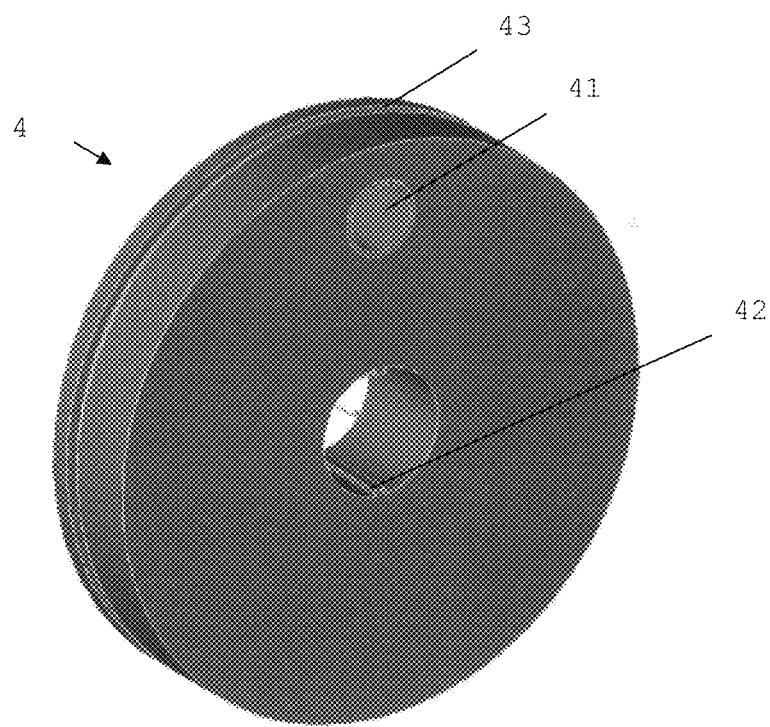
FIG. 3 is a schematic illustration of a finisher disc which is capable of being used in the membrane module according to the invention.

FIG. 3 shows a finisher disc 4 according to the invention which closes the housing 2 on both sides (FIG. 1). The finisher disc 4 shown has a circular cross-section which corresponds to the cross section of the housing. A sealing groove 43 for receiving a seal such as a rubber seal is preferably provided for gas-tight sealing. The finisher disc 4 has at least one bore 41 for letting in a feed flow, or for letting out a retentate flow (feed inlet bore/retentate outlet bore 41). The finisher disc 4 furthermore has a bore for push-fitting the permeate tube 3 (FIG. 1), said bore in the present case being centrally disposed. The bore has a circular cross-section which corresponds to the permeate tube cross section 32 (FIG. 2). Moreover, the bore has at least one feather key 42 for aligning in an alternating manner the permeate tube 3 and the finisher disc 4. The finisher disc 4 shown has a round cross-section which is provided with two feather keys 42 which are offset by 180°.

Figure 4:
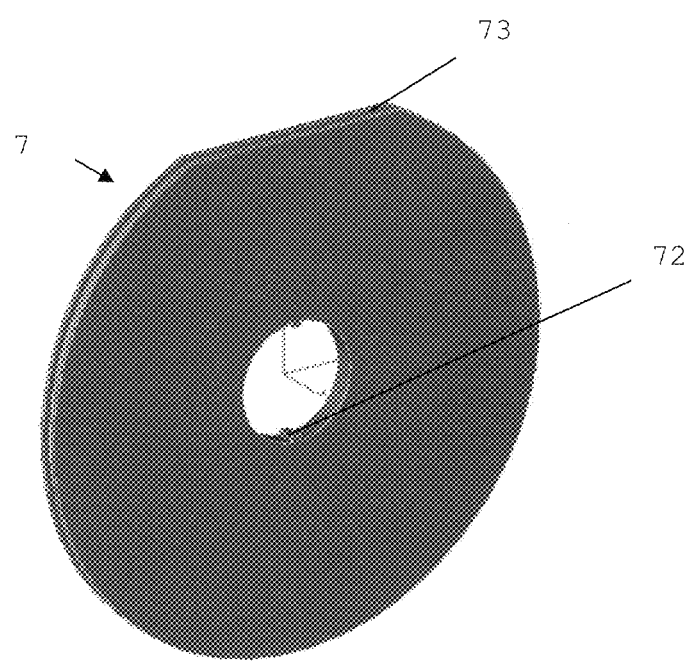
FIG. 4 is a schematic illustration of a deflection disc which is capable of being used in the membrane module according to the invention.

FIG. 4 shows a deflection disc 7 according to the invention which can be push-fitted over the permeate tube. The deflection disc 4 shown has a substantially circular cross-section which corresponds to the cross section of the housing, wherein the cross section is however chamfered on a circular segment such that the feed flow within the membrane module can make its way from one compartment region to the next. The deflection discs by way of the chamfered circular segments thereof are preferably installed so as to be in each case 180° offset in the housing such that the feed flow in a meandering feed stream makes its way from the at least one feed inlet 41 (FIG. 1) to at least one retentate outlet. A sealing groove 73 for receiving a seal such as a rubber seal is preferably provided for gas-tight sealing.

The deflection disc 7 has a bore for push-fitting the permeate tube 3 (FIG. 1), said bore in the present case being centrally disposed. The bore has a circular cross-section which corresponds to the permeate tube cross-section 32 (FIG. 2). Moreover, the bore has at least one feather key 72 for aligning in an alternating manner the permeate tube 3 and the deflection disc 7. The deflection disc 7 shown has a round cross-section which is provided with two feather key 72 which are offset by 180°.

Figure 5:
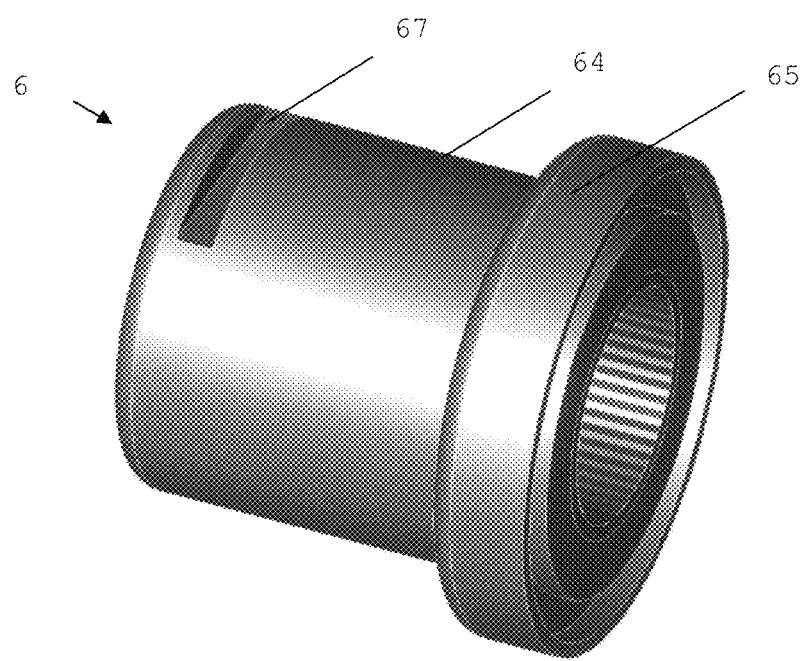
FIG. 5 is a schematic illustration of a permeate cap which is capable of being used in the membrane module according to the invention.

FIG. 5 shows a permeate cap 6 which serves for flange-fitting the permeate tube 3 to the finisher disc in a flange region 65. The permeate cap 6 preferably has an internal thread which corresponds to the external thread at the ends of the permeate tube 3. The permeate cap 6 preferably has a cylindrical permeate cap body 64 in which a key groove 67 for fixing the permeate cap 6 on the permeate tube 3 by means of a key tool is provided. Alternatively, the permeate cap body can also be configured in an angular manner, for example so as to be hexagonal, such that said permeate cap body can be tightly screwed to the permeate tube with the aid of a key tool.

LIST OF REFERENCE SIGNS

1. Membrane module
2. Housing
3. Permeate tube
4. Finisher discs
5. Stage separation disc
6. Permeate cap
7. Deflection disc
31. Permeate inlet bores
32. Permeate tube cross section
33. Permeate outlet
34. Groove
41. Feed inlet bore/Retentate outlet bore
42. Feather key
43. Sealing groove
64. Permeate cap body
65. Flange region
67. Key groove
72. Feather key
73. Sealing groove.

The invention claimed is:

1. Membrane module comprising a housing for forming a container interior space by means of first and second finisher discs at two respective end sides of the housing thereby closing the housing in a pressure-tight manner, the first finisher disc comprising at least one feed inlet and at least one bore for push-fitting a permeate tube, and the second finisher disc comprising at least one retentate outlet and at least one bore for push-fitting a permeate tube, wherein at least one membrane pocket stack which has a plurality of membrane pockets which are lined up beside one another and are mutually separated by seals and which are push-fitted onto a permeate tube disposed in the container interior space, at least one end of the permeate tube forming a permeate outlet, wherein the permeate tube protrudes beyond the at least one bore for push-fitting a permeate tube of the finisher discs, wherein the permeate tube and the finisher discs by way of a key-and-groove connection are aligned in an alternating manner on the permeate tube and the bores for push-fitting a permeate tube, wherein two grooves are provided in the permeate tube, and two feather keys are in each case provided in the bore for push-fitting a permeate tube of the finisher discs.

2. The membrane module according to claim 1, wherein the at least one membrane pocket stack further comprises deflection discs that by means of a central bore are push-fitted onto the permeate tube, wherein the deflection discs have in each case recesses for directing in a meandering feed stream a feed flow from the at least one feed inlet to the at least one retentate outlet, wherein the permeate tube and the deflection discs by way of a key-and-groove connection are also aligned in an alternating manner.

3. A method of separating mixtures of liquids and/or gases comprising providing a membrane module according claim 1, for separating mixtures of liquids and/or gases.

4. A method of separating mixtures of liquids and/or gases according to claim 3, for reducing emissions on breathing lines of storage tanks.

5. The membrane module according to claim 2, wherein at least one feather key is in each case provided in the central bore of the deflection discs.

6. The membrane module according to claim 5, wherein two feather keys are provided in the central bores of the deflection disc, said feather keys being offset by 180°.

\* \* \* \* \*